United States Patent [19]
Frankel et al.

[11] Patent Number: 5,187,706
[45] Date of Patent: Feb. 16, 1993

[54] DUAL ACCESS RINGS FOR COMMUNICATIONS NETWORKS

[75] Inventors: Rise J. Frankel, Somerset; K. S. Liu, Holmdel, both of N.J.

[73] Assignee: AT&T Bell Laboratories, Murray Hill, N.J.

[21] Appl. No.: 606,021

[22] Filed: Oct. 30, 1990

[51] Int. Cl.⁵ .......................... H04J 3/14; G06F 11/00
[52] U.S. Cl. ................................ 370/16.1; 370/85.14; 371/11.2; 379/279
[58] Field of Search .................. 370/13, 14, 16, 16.1, 370/85.9, 85.13, 85.14, 85.15, 94.3; 371/8.1, 8.2, 9.1, 11.1, 11.2, 11.3, 20.1, 20.6; 379/219, 220, 221, 268, 269, 279; 340/825.05, 825.02

[56] References Cited

U.S. PATENT DOCUMENTS

| | | | |
|---|---|---|---|
| 4,621,362 | 11/1986 | Sy | 370/85.14 |
| 4,701,756 | 10/1987 | Burr | 370/16 |
| 4,775,976 | 10/1988 | Yokoyama | 371/8.2 |
| 4,811,337 | 3/1989 | Hart | 370/85.13 |
| 5,027,342 | 6/1991 | Boulton et al. | 370/16 |

OTHER PUBLICATIONS

"A Study of Survivability Versus Cost for Several Fiber Network Architectures", D. J. Kolar, et al., IEEE Int. Conf. on Communications, 1988, pp. 61-66.
"Wrapping and Merging Reconfiguration Mechanism of a Counter-Rotation Dual Ring", S. Nakayashiki et al., IEEE Infocom, 1989. pp. 989-997.

Primary Examiner—Douglas W. Olms
Assistant Examiner—Alpus H. Hsu
Attorney, Agent, or Firm—T. Stafford

[57] ABSTRACT

A switching architecture is disclosed which includes a dual access ring structure interconnecting the location of a customer, a primary central office, a backup central office and a remote central office (hub office) which does not directly serve the customer location. The architecture enables transport of a customer's communications traffic to be automatically restored in the event a failure occurs in the primary transport route of the traffic from the customer location to the hub office via the primary central office by automatically selecting a transport route free of a failure. Such a failure is detected whether caused by a so-called "hard" failure or a so-called "soft" failure. Optionally, each type of automatic network reconfiguration is executed in a manner such that as soon as it is possible to employ the original configuration, the network automatically reverts to the original configuration, thereby easing network maintenance activity. Corresponding reconfigurations are performed to insure recovery of traffic originating from the hub office and destined for the customer's location. Recovery of communications can typically be provided in a time period on the order of milliseconds, as opposed to days.

16 Claims, 4 Drawing Sheets

DUAL ACCESS RINGS FOR COMMUNICATIONS NETWORKS

TECHNICAL FIELD

This invention relates to protection switching systems in self healing networks and, more particularly, to overcoming a failure of communications between a customer location and that customer's primary central office.

BACKGROUND OF THE INVENTION

The ability to maintain communications not withstanding network failures has become increasingly important. Fiber facility cuts, central office failures, and equipment failures are the failure mechanisms of most concern to network providers. Such failures, which have disrupted communications service for days, are catastrophic to information intensive industries that rely on communications to accomplish their day-to-day business.

Prior attempts to avoid a communications interruption caused by network failures in a primary central office serving a subscriber (customer), in the communications link between a customer and the primary central office or in the link between the primary central office and a hub office have resulted in undesirable consequences. These consequences, which included excessive switching, failure propagation, and unnecessary maintenance activity, are brought about because of ineffective switching architectures and ineffective switch triggering mechanisms. In addition, prior switching architectures could not survive a failure of communications between the customer location and the primary central office, and a simultaneous failure of communications between the primary central office and the corresponding hub office.

SUMMARY OF THE INVENTION

The problems with prior attempts to recover from failures of direct communications with a primary central office serving a customer are overcome, in accordance with an aspect of the invention, by employing switching and broadcasting elements in a switching architecture to implement a dual access ring structure. The dual access ring structure interconnects the location of the customer, the primary central office, the backup central office and a remote central office (hub office) which does not directly serve the customer location and, in accordance with an aspect of the aspect of the invention, automatically restores transport of a customer's communications traffic (traffic) in the event of a failure is detected along the primary route from the customer location to the hub office. To this end, the backup central office is continuously supplied by the customer location with a duplicate of the customer's traffic. A broadcast element in the backup central office, employed to effect the dual access ring, duplicates customer traffic for transmission to the primary central office and, simultaneously, for potential transport to the hub office.

In the event of a failure in communications between the primary central office and the customer location, an alternate transport route free of any failure is automatically selected and employed to transport the customer's communications traffic from the customer location to the hub office. Such a failure is detected, in accordance with an aspect of the invention, whether such failure is caused by a so-called "hard" failure or a so-called "soft" failure. If the communications failure is caused by a failure in the link between the primary central office and the customer location, an identical copy of the customer traffic is automatically routed through the broadcast element in the backup central office to the primary central office and, thereafter, transported as usual, by the remaining portion of the primary transport route, to the hub office. If there is a communications failure of the primary central office, a selection element in the backup central office effects automatic protection switching. The protection switching is accomplished by selecting and actually supplying to the hub office the duplicate customer traffic for potential transport to the hub office to provide recovery from the communications failure. If there is a failure of the link between the primary central office and the hub office, at least the customer traffic, and optionally any additional traffic that is transported over the failed link, is rerouted via a selection element in the backup central office towards the hub office.

Optionally, each type of network reconfiguration is implemented so that the network automatically reverts back to the original configuration as soon as possible upon correction of the cause of the communications failure. This automatic reversion eases network maintenance activity. Corresponding network reconfigurations are performed to insure recovery of traffic originating from the hub office and destined for the customer's location. An advantage of the invention is that the time required for recovery of communication can typically be shortened to the order of milliseconds, as opposed to days.

BRIEF DESCRIPTION OF THE DRAWING

In the Drawing.

Shown in FIG. 1, in simplified block diagram format, is an exemplary portion of a network configured in a dual access ring structure, in accordance with aspects of the invention.

Shown in FIG. 3 is an expanded view of a primary central office and a backup central office, illustrating additional details of the invention and a potential simplification.

DETAILED DESCRIPTION

Figure 1:
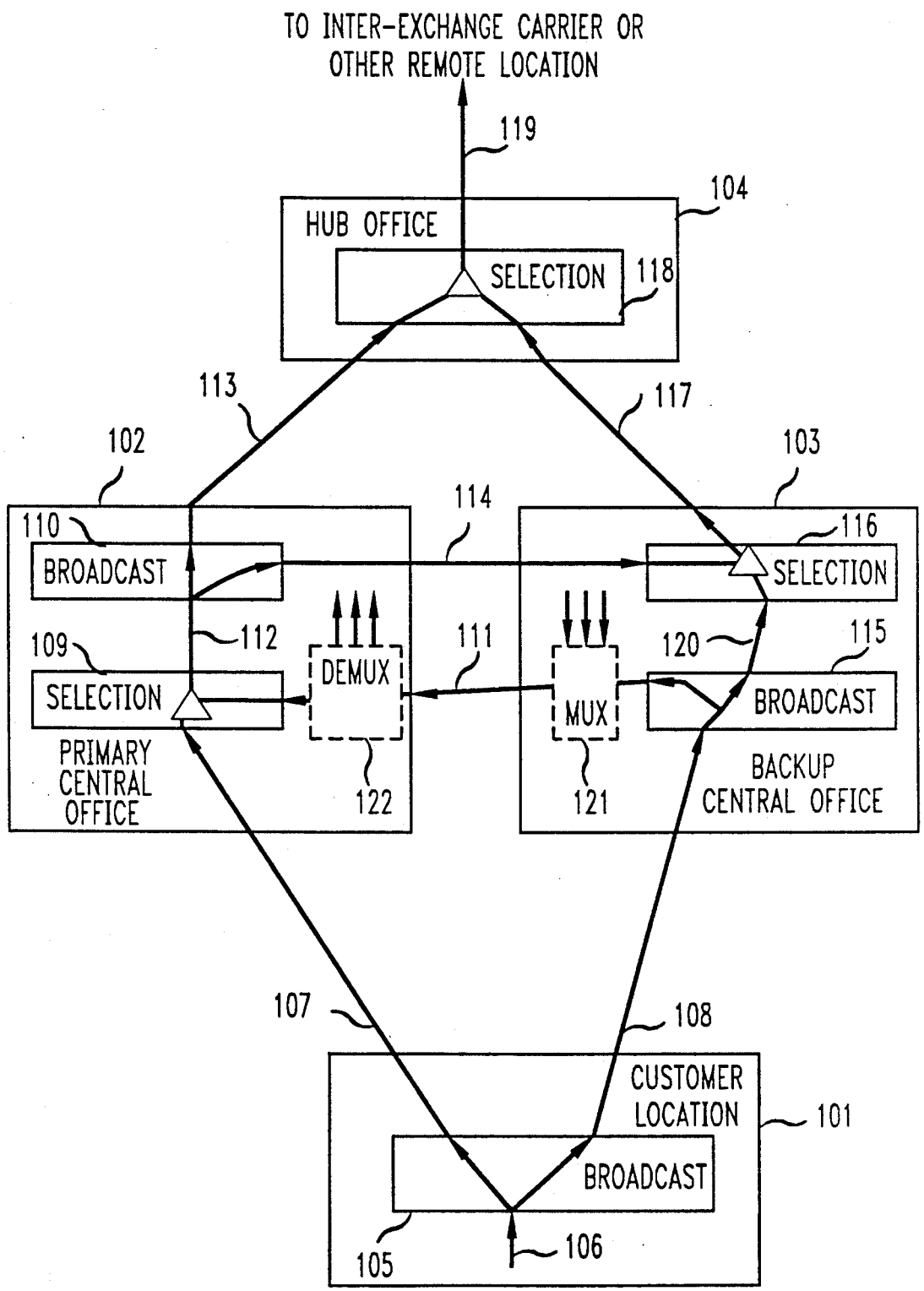

Shown in FIG. 1, in simplified block diagram format, is an exemplary portion of a network comprised of customer location 101, primary central office 102, backup central office 103 and hub office 104. In accordance with an aspect of the invention, this network portion is interconnected via primary central office 102 and backup central office 103 into a dual access ring configuration. FIG. 1 only depicts the available transmission paths from customer location 101 to hub office 104. Subsequently, in connection with FIG. 2, the paths from hub office 104 back towards customer 101 will be described. It is noted that the invention is generally applicable to any nodes of any type of communications network and should not be construed to be limited to customer location and central office types of applications which are employed for clarity purposes only. Also, other additional traffic, not of specific interest with respect to the instant invention and potentially originating from any location in the network may pass or terminate through any central office described herein without limiting the scope or spirit of the invention.

A customer's communications traffic (traffic) is any form of information desired to be transmitted or received by a customer. Communications traffic from customer location 101 is supplied to broadcasting element 105 over signal path 106. A broadcasting element replicates the traffic supplied to it and transmits that traffic to at least two paths. Broadcasting elements are well known. The rate of and medium employed for each resulting transmission need not be the same. Broadcasting element 105 transmits one copy of the customer traffic over link 107 to primary central office 102 and another copy over link 108 to backup central office 103. The term link, as employed in this application, is to be construed as a logical communications facility employed for the purpose of interconnecting the various specified elements and not imposing any limitation on the type and/or number of facilities employed to implement any particular link. Such logical links which may pass through other central offices (not shown for clarity purposes) are well known. For purposes of this example links 107 and 108 are standard, well known digital transmission lines carrying a DS1 signal.

Primary central office 102 is comprised of at least selection element 109 and broadcast element 110. A selection element receives as inputs two or more signals and supplies one of those signal as an output based on a predetermined selection criteria. Typically, the selection criteria is chosen such that the input signal of better quality is supplied as an output. More particularly, and in accordance with an aspect of the invention, the signal of interest for determining which input signal is to be supplied as an output may be only a particular signal or set of signals of interest multiplexed together with other signals. In the event the quality of the signals are essentially equal, one of the inputs is preferentially chosen, in a predetermined manner, to be supplied as the output.

Poor signal quality may be detected by determining the presence of, without limitation, so-called "hard" failures, i.e., the detection within one of the received signals of a particular signal or the absence of one of the signals at an input of the selection element, or the detection of so-called "soft" failures, i.e., the degrading of the relative quality of one of the received signals, e.g., a bit error rate (BER) beyond a predetermined threshold. Signals without poor quality are considered to have high quality. Arrangements for determining signal quality are well known.

Selection element 109 receives the customer traffic directly via link 107 and a duplicate of the customer traffic via link 108, broadcast element 115, optional multiplexer 121, link 111 and optional demultiplexer 122. Optional multiplexer 121 and optional demultiplexer 122 enable the use of link 111 for transporting between backup central office 103 and primary central office 102 other signals in addition to the customer traffic originating at customer location 101. Such signals may include, without limitation, traffic from other customer locations for which protection is being provided or other information required to be passed from backup central office 103 to primary central office 102. Link 111, in this example, is a well known digital transmission line carrying a DS3 signal. However, if optional multiplexer (MUX) 121 and optional demultiplexer (DEMUX) 122 are not employed link 111 could be a digital transmission line carrying a DS1 signal. Selection element 109 selects either the customer traffic received from link 107 or the traffic received over link 111 and supplies the selected traffic signal to link 112.

Elements 105, 109, and 115 and links 107, 108 and 111 comprise a first self-healing ring. This first self-healing ring is called a low-speed self-healing ring because its fundamental transmission rate is at the typical speed of access to the central offices which, for economy and efficiency purposes, is typically lower than the transmission rate of inter-office communications. Optional "bundling" of traffic on link 111, however, is permitted and is not considered to affect the nature of the ring. DS1 signals are typically considered "low" rate digital signals.

In this example, elements 110, 116 and 118 together with links 113, 114 and 117 which carry the inter-office signals that are typically at a higher transmission rate than links 107, 108 and 111 comprise the inter-office or high-speed self-healing ring. Links 113, 114 and 117 typically carry other signals multiplexed with the customer traffic supplied from link 106 that are to be transported from primary central office 102 to hub office 104. In practice each link may be of any transmission rate desired by the implementor provided that the signal comprising the customer traffic herein discussed is present. DS3 signals are typically considered "high" rate digital signals. At the implementor's discretion links 111 and 114 can share the same physical right-of-way or even the same medium. They are shown here separately and distinctly for clarity purposes.

Normal operating conditions are defined as the state of the network in which no failures of communications whatsoever have occured. Under normal operating conditions, selection element 109 selects and supplies as an output the traffic from link 107 onto link 112. Broadcast element 110 duplicates the customer traffic supplied from link 112 and supplies one copy directly to hub office 104 via link 113 and a second copy to hub office 104 indirectly via link 114, selection element 116 in backup central office 103, and link 117. Additionally, broadcast element 110 can optionally duplicate other traffic at primary central office 102 destined for hub office 104. Selection element 118, in hub office 104, selects either the traffic supplied from link 113 or from link 117, and supplies the selected traffic to link 119 for transmission to an inter-exchange carrier or other remote location. Again, under normal operating conditions, selection element 118 selects the traffic from link 113 and supplies as an output onto link 119 the traffic from link 113.

In backup central office 103, broadcast element 115 receives the customer traffic from link 108 and duplicates that traffic. One of the duplicate copies of the customer traffic is transmitted towards primary central office 102 via link 111 for possible selection and further duplication, in accordance with an aspect of the invention. As mentioned above, selection element 109 in primary central office 102 receives this copy of the customer traffic from link 111. In accordance with an aspect of the invention, a second copy of the customer traffic, created to be available for transport to hub office 104, is transmitted onto link 120 interconnecting broadcast element 115 and selection element 116. Selection element 116 in backup central office 103 receives the first copy of the customer traffic from link 114 and the second copy from link 120. Under normal operating conditions, selection element 116 selects the customer traffic from link 114 and supplies it as an output onto link 117.

An aspect of the overall switching function performed by elements 105, 109, 110, 115, 116 and 118 that is atypical of prior protection switching schemes is that these elements permit switching elements to be located between the element at the source node and the corresponding element at the terminating node, i.e., a mated pair of switching elements is not required. The switch function employed, for each of the multiple links in the rings, is a unidirectional, one sided switch operation that does not require end-to-end communications between mated elements to accomplish the switch.

In this example, add/drop multiplexers may be employed to implement selection and broadcast elements. An aspect of the selection performed by selection element 116 atypical of prior ring architectures employing add/drop multiplexers is that the selection between links 114 and 120 ensures that only one copy of the customer traffic can appear on link 117 in the event of a failure in primary central office 102. Additionally, because links 111, 114, 117 and 113 can carry the customer traffic multiplexed with other signals, it is required, in accordance with an aspect of the invention, that each switch element detect that valid customer traffic is actually being carried rather than some type of filler traffic signal within a properly formatted multiplexed signal.

Thus, in accordance with an aspect of the invention, a set of two rings is established. The first ring, referred to as the low-speed self-healing ring, is comprised of broadcast elements 105, 115, selection element 109 and links 107, 108 and 111. The second ring, referred to as the high-speed self-healing ring, is comprised of broadcast elements 110, selection elements 116 and 118 as well as links 113, 114 and 117. Because of the independent nature of the two ring aspect of this invention, a failure in one ring does not affect the operation of the other ring and protection is provided against certain types of failures occurring simultaneously in both rings. The two rings are interconnected in primary central office via link 112 and at least in backup central office 103 via at least link 120, in accordance with an aspect of the invention. Hub office 104 thereby obtains access to the customer traffic via either primary central office 102 or backup central office 103, hence the name of this configuration as a dual access ring.

In the event of a failure of link 107, direct communications between customer location 101 and primary central office 102 is interrupted. Primary central office 102, however, is still operational. Selection element 109 selects the copy of the customer traffic arriving from link 111 via link 108 and broadcast element 115. This copy of the customer traffic is made available via the duplication in broadcast element 115, in accordance with an aspect of the invention. The selected customer traffic is supplied as an output to link 112 in the usual manner and, thereafter, transported to hub office 104, as described above. Thus, recovery from the failure in link 107 is accomplished and no further switching is required, thereby eliminating failure propagation.

In the event of a failure of link 113, direct communications between hub office 104 and primary central office 102 is interrupted. Primary central office 102, however, is still operational. Selection element 118 in hub office 104 selects the copy of the customer traffic arriving from link 117 via link 114 and selection element 116 in backup central office 103. This copy of the customer traffic is made available via the duplication in broadcast element 110 and the selection performed by selection element 116, in accordance with an aspect of the invention. Thus, recovery from the failure in link 113 is accomplished and no further switching is required. Failure propagation is thereby eliminated.

Upon failure of primary central office 102, selection element 116 selects the customer traffic on link 120 which was duplicated by broadcast element 115, in accordance with an aspect of the invention. In hub office 104, selection element 118 selects the customer traffic arriving via link 117 which is supplied as an output by selection element 116.

A failure in links 108, 111, 114 or 117 or in elements 115 or 116 does not affect the transport route of customer traffic under normal operating conditions. Therefore, upon such a failure, the customer traffic still traverses the network via its usual transport route comprised of link 107, selection element 109, broadcast element 110 and link 113.

Figure 2:
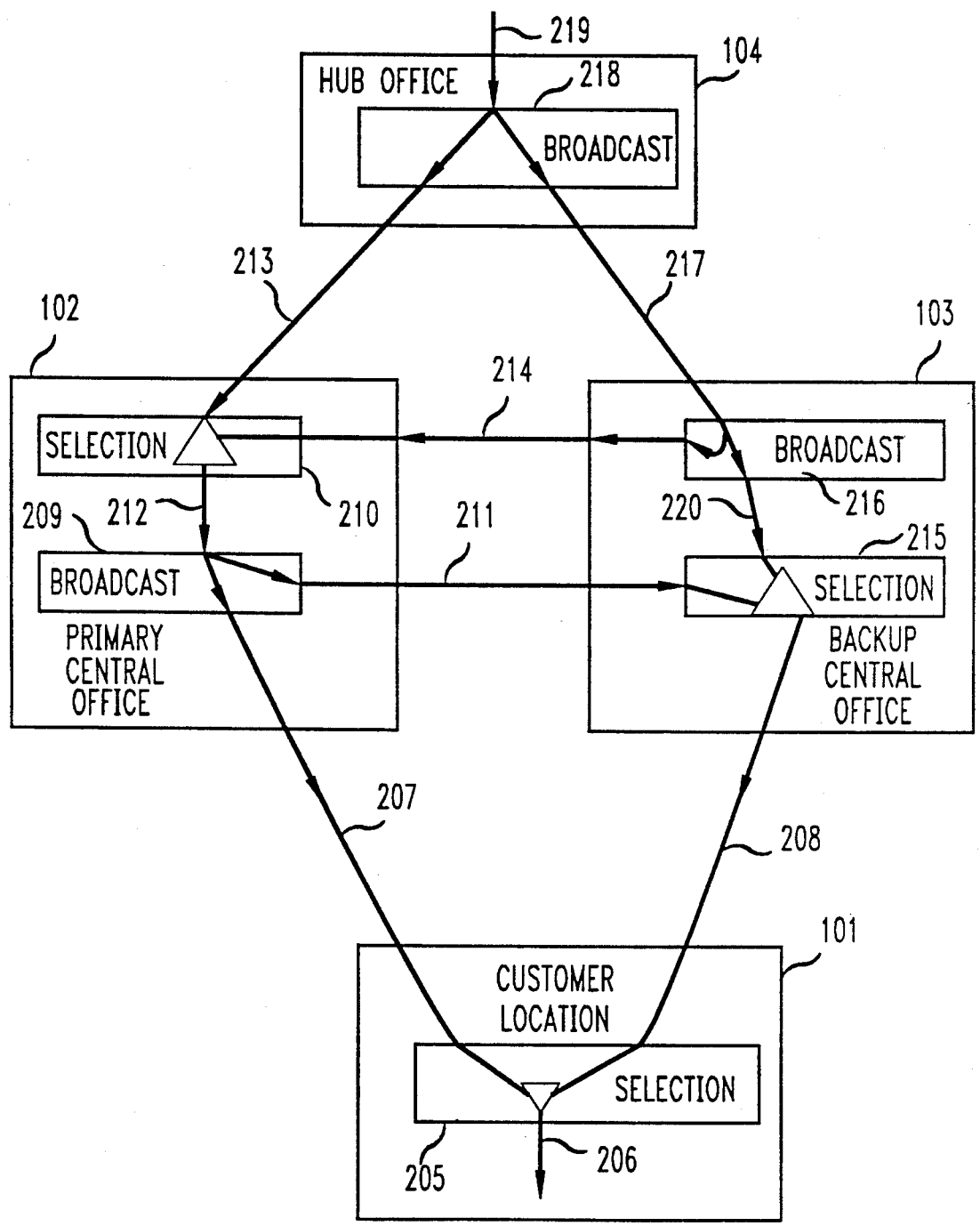
FIG. 2 depicts, in simplified block diagram format, the same exemplary network portion as shown in FIG. 1 but displaying the available transmission paths and configurations required to transport incoming customer traffic from a hub office to a customer location.

FIG. 2 depicts, in simplified block diagram format, the same exemplary network portion as shown in FIG. 1 but displaying the available transmission paths and configurations required to transport incoming customer traffic from hub office 104 to customer location 101. A symmetry is noted such that, in this direction, for each selection element employed in FIG. 1 a corresponding broadcast element is employed. Similarly, for each broadcast element employed in FIG. 1 a corresponding selection element is employed. The optional add/drop multiplexers and demultiplexers are not shown in this example for simplicity and clarity of exposition.

Under normal operating conditions duplication of customer traffic arriving at hub office 104 via link 219 and destined for customer location 101 is performed by broadcast element 218. Additionally, other traffic destined for primary central office 101 via link 213 may also be duplicated. Selection element 210 in primary central office 102 selects and supplies as an output the customer traffic from link 213 onto link 212. Broadcast element 209 duplicates the customer traffic supplied from link 212 and supplies one copy directly to customer location 101 via link 207 and a second copy to customer location 101 indirectly via link 211, selection element 215 in backup central office 103, and link 208. Selection element 206 in customer location 101 receives the customer traffic supplied from link 207 and from link 208, and supplies as an output onto link 206 the customer traffic from link 207.

In backup central office 103, broadcast element 216 receives the customer traffic from link 217 and duplicates that traffic. One of the duplicate copies of the customer traffic is transmitted towards primary central office 102 via link 214 for possible selection and further duplication, in accordance with an aspect of the invention. As mentioned above, selection element 210 in primary central office 102 receives this copy of the customer traffic from link 214. In accordance with an aspect of the invention, a second copy of the customer traffic, created to be available for transport to customer location 101, is transmitted onto link 220 interconnecting broadcast element 216 and selection element 215. Selection element 215 in backup central office 103 receives the first copy of the customer traffic from link 211 and the second copy from link 220. Under normal operating conditions, selection element 215 selects the customer traffic from link 211 and supplies it as an output onto link 208.

In the event of a failure of link 213, direct communications between primary central office 102 and hub office 104 is interrupted. Primary central office 102, however, is still operational. Selection element 210 selects the copy of the customer traffic arriving from link 214 via link 217 and broadcast element 216. This copy of the customer traffic is made available via the duplication in broadcast element 216, in accordance with an aspect of the invention. The selected customer traffic is supplied as an output to link 212 in the usual manner and, thereafter, transported to customer location 101, as described above. Thus, recovery from the failure in link 213 is accomplished and no further switching is required, thereby eliminating failure propagation.

In the event of a failure of link 207, direct communications between customer location 101 and primary central office 102 is interrupted. Primary central office 102, however, is still operational. Selection element 206 in customer location 101 selects the copy of the customer traffic arriving from link 208 via link 211 and selection element 215 in backup central office 103. This copy of the customer traffic is made available via the duplication in broadcast element 209 and the selection in selection element 215, in accordance with an aspect of the invention. Thus, recovery from the failure in link 207 is accomplished and no further switching is required. Failure propagation is thereby eliminated.

Upon failure of primary central office 102, selection element 215 selects the customer traffic on link 220 which was duplicated by broadcast element 216, in accordance with an aspect of the invention. In customer location 101, selection element 206 selects the customer traffic arriving via link 208 which is supplied as an output by selection element 215.

A failure in links 208, 211, 214 or 217 or in elements 215 or 216 does not affect the transport route of customer traffic under normal operating conditions. Therefore, upon such a failure, the customer traffic still traverses the network via its usual transport route comprised of link 213, selection element 210, broadcast element 209 and link 207.

Figure 3:
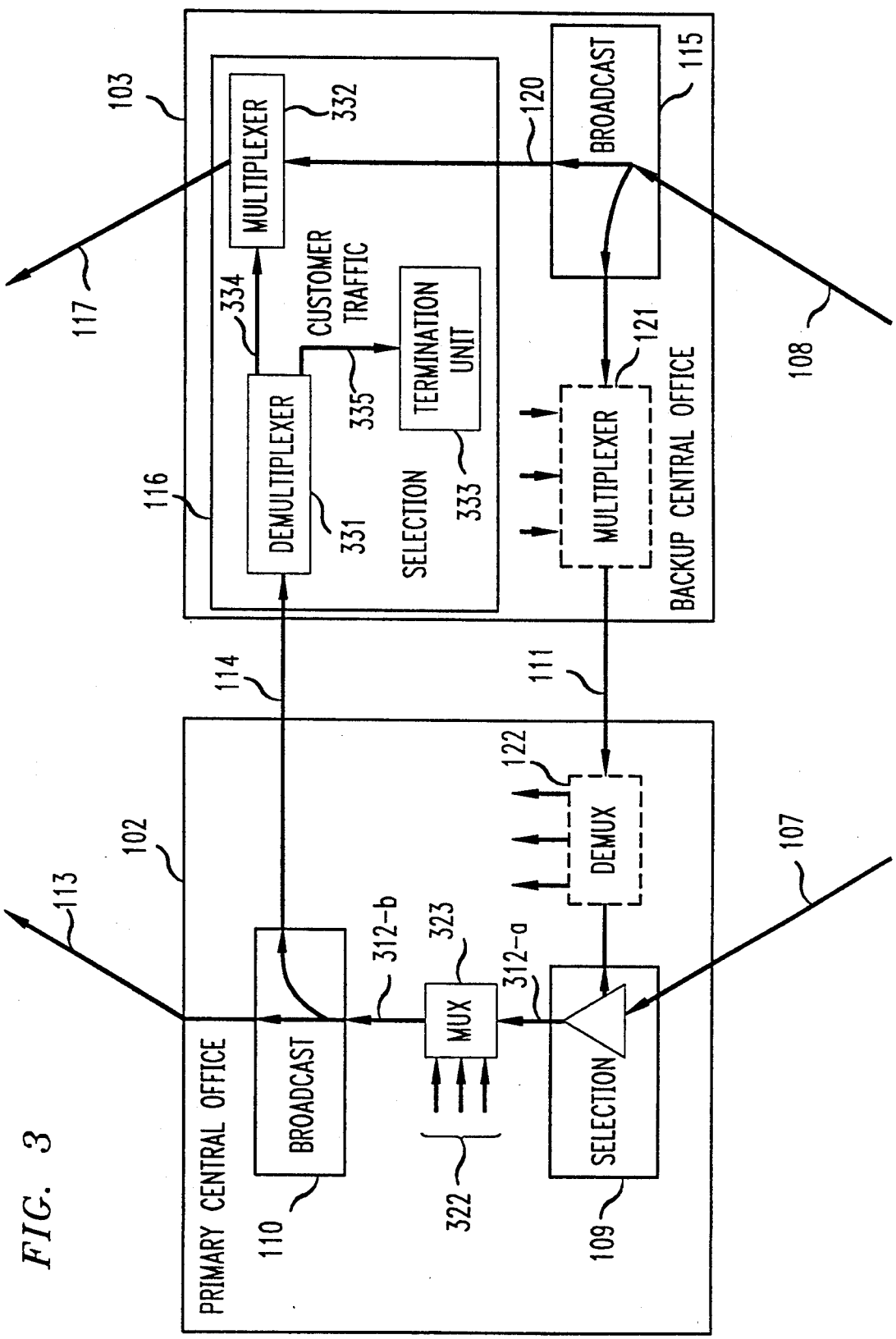

Shown in FIG. 3 is an expanded view of primary central office 102 and backup central office 103, illustrating another exemplary implementation including several additional details of the invention and a potential simplification. Link 112 (FIG. 1) is replaced in FIG. 3 by link 312-*a*, multiplexer 323 and link 312-*b*. This substitution is for flexibility purposes and to gain efficiency in the employment of the inter-office ring, and specifically link 114. The inter-office ring is employed for the transport and protection of traffic in addition to the traffic from customer location 101 specifically protected by the low-speed ring shown in FIG. 1, i.e., to protect traffic originating at other customer locations. Additional signals arriving at primary central office 102 on links 322 are multiplexed with the signal carried on link 312-*a* via multiplexer 323 to form a combined signal on link 312-*b* destined for hub office 104. Links 312-*b*, 113, 114 and 117 are, for purposes of this example, digital transmission lines carrying a DS3 signal.

In backup central office 103, selection element 116 could perform an actual intelligent selection, as discussed above in connection with FIG. 1, or, selection element 116 could be replaced, without violating the spirit or scope of the invention by a terminate/add element as shown in FIG. 3. In the terminate/add mode, under normal conditions, link 120 is always chosen and transported to hub office 104 via link 117 where selection is done by selection element 118. This would be performed by selection element 116 operating in an terminate/add mode. In terminate/add mode, the customer traffic contained within the multiplexed signal received from link 114 is dropped onto link 335 and subsequently terminated by termination unit 333. Also, the customer traffic from link 120 is added to the remaining signal. The terminate/add function eliminates the need for an additional intelligent selection element at the backup central office. A terminate/add function employs typical multiplexers or add/drop multiplexers provisioned in terminate/add mode to form a terminate/add element. In terminate/add mode the copy of the customer traffic carried via link 114 is replaced with the copy transported on link 120 without disturbing any other signals multiplexed on link 114, thereby ensuring that only one copy of the customer traffic is transmitted onto link 117. The resulting signal is forwarded to link 117. Such a terminate/add element would supply the customer traffic from link 120 in a predetermined manner as an output onto link 117.

As shown in FIG. 3 element 116 is comprised of demultiplexer 331, multiplexer 332, termination unit 333 and links 334 and 335. Demultiplexer 331 receives a signal from link 114 and demultiplexes the signal back to its original components which include at least the signals transported on links 334 and 335. The signal on link 334, which may be a plurality of signals multiplexed together, is destined for hub office 104 (FIG. 1). The signal on link 334 carries traffic from other customer locations which was supplied over at least one of signals 322 to multiplexer 323. Multiplexer 332 receives the signal from link 334 and the signal from link 120, the replacement for the copy of the customer traffic signal carried on link 335, multiplexes the received signals together and supplies the resulting signal to link 117. To gain further economies, other low priority unprotected traffic could be transported in the spare capacity available on link 114 which is shown as the customer traffic since it is terminated in backup central office 103.

Figure 4:
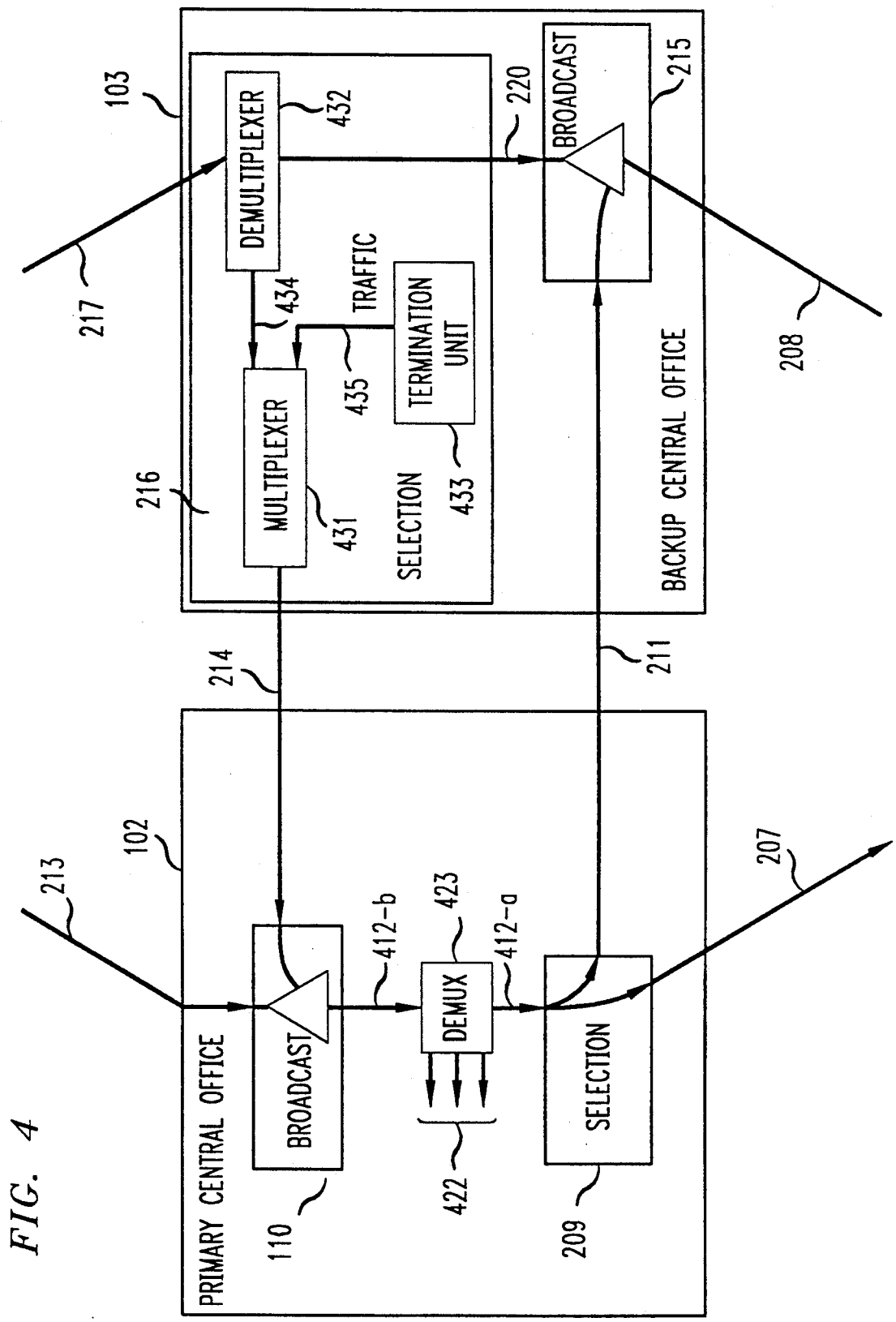
FIG. 4 illustrates an expanded view of a primary central office and a backup central office, illustrating an architecture for transporting customer traffic in the reverse direction from that shown in FIG. 3.

Shown in FIG. 4 is an expanded view of primary central office 102 and backup central office 103, illustrating an architecture for transporting customer traffic in the reverse direction from that illustrated in FIG. 3, i.e., from hub office 104 to customer location 101. Although FIG. 4 is not symmetrical with FIG. 3 in the same manner as FIG. 2 is with FIG. 1, the operation of the architecture shown in FIG. 4 will be readily apparent to those skilled in the art.

We claim:

1. Apparatus in a backup central office for restoring transport of communications traffic between a customer location and a remote central office not directly serving said customer location in a network comprised of at least said customer location, a primary central office directly serving said customer location, said backup central office and said remote central office in the event that a failure develops in any portion of said network comprising a primary route over which said communications traffic passes from said customer location through at least said primary central office to said remote central office, and said primary central office including at least means for selecting and supplying as an output one from at least two duplicates of said communications traffic and means for transmitting at least two duplicates of said communications traffic, at least one of said duplicates being transmitted without further selection in said primary central office toward said remote central office, and said remote central office including at least means for selecting one from at least two received duplicates of said communications traffic, the apparatus comprising:

means for receiving a first duplicate of said communications traffic transmitted from said customer location;

means for continuously broadcasting a first copy of said first duplicate of communications traffic received from said customer to at least said means for selection in said primary central office and a second copy of said first duplicate for potential transport to said remote central office;

means for receiving from said primary central office a signal containing at least a copy of said communications traffic;

means for selecting and supplying as an output a copy of said communications traffic from at least said copy of communications traffic received in said signal from said primary central office or said second copy for potential transport; and means for transmitting said output of said means for selecting and supplying of said apparatus to said remote central office.

2. The apparatus as defined in claim 1 wherein said means for selecting a copy of said communications traffic is responsive to at least a quality indication of said copy of communications traffic received in said signal from said primary central office and a quality indication of said second copy for potential transport for selecting and transmitting either said copy of communications traffic received in said signal from said primary central office or said second copy for potential transport.

3. The apparatus as defined in claim 1 wherein each of said means for selecting is capable of switching which input supplied thereto is supplied as an output independent of the state of selection of any other means for selecting.

4. The apparatus as defined in claim 1 wherein said output of each of said means for selecting is independent of any of said means for broadcasting.

5. The apparatus as defined in claim 1 wherein said means for selecting and supplying said copy of said customer communications traffic selects from a high transmission rate signal containig at least a copy of said communications traffic received from said primary central office or a low transmission rate signal containing said second copy of said first duplicate for potential transport to said remote central office and supplies as an output a high transmission rate signal for transmission.

6. The apparatus as defined in claim 1 wherein said means for selecting and supplying of said apparatus is set in a predetermined manner and includes means for terminating/dropping.

7. The apparatus as defined in claim 1 wherein a selection by said means for selecting and supplying in said backup central office is predetermined.

8. The apparatus as defined in claim 1 wherein said means for receiving the signal from said primary central office further includes means for receiving other traffic from said primary central office destined for said remote central office.

9. Apparatus in a backup central office for restoring transport of communications traffic between a customer location and a remote central office not directly serving said customer location in a network comprised of at least said remote central office, a primary central office directly serving said customer location, said backup central office and said customer location in the event that a failure develops in any portion of said network comprising a primary route over which said communications traffic passes from said remote central office through at least said primary central office to said customer location, and said primary central office including at least means for selecting and supplying as an output one from at least two duplicates of said communications traffic and means for transmitting at least two duplicates of said communications traffic, at least one of said duplicates being transmitted without further selection in said primary central office toward said customer location, and said customer location including at least means for selecting one from at least two received duplicates of said communication traffic, the apparatus comprising:

means for receiving a first duplicate of communications traffic transmitted from said remote central office;

means for continuously broadcasting a first copy of said first duplicate of communications traffic received from said customer to at least said means for selection in said primary central office and a second copy of said first duplicate for potential transport to said customer location;

means for receiving from said primary central office a signal containing at least a copy of said communications traffic;

means for selecting and supplying as an output a copy of said communications traffic from at least said copy of communications traffic received in said signal from said primary central office or said second copy for potential transport; and means for transmitting said output of said means for selecting and supplying of said apparatus to said customer location.

10. A communications network system for communicating between a customer location and a remote central office not directly serving said customer location in a network including;

i) a first communication ring interconnecting said customer location, a primary central office and a backup central office;

ii) a second communication ring interconnecting said primary central office, said backup central office and said remote central office; and iii) means for interconnecting said first ring and said second ring in said primary central office and in said backup central office wherein said first ring comprises:

means located at said customer location for broadcasting at least two duplicates of communications traffic from said customer location;

means for transporting a first of said duplicates to said primary central office;

means for transporting a second of said duplicates to said backup central office;

means in said backup central office for broadcasting a first copy of said second duplicate to said primary central office and a second copy of said second duplicate for potential transport to said remote central office;

means for transporting at least said first copy of said second duplicate from said backup central office to said primary central office; and means in said primary central office for selecting as an output for transmission to said second ring either said first duplicate or said first copy of said second duplicate.

11. The system as defined in claim 10 wherein said second ring includes:

means located at said primary central office for broadcasting at least two duplicates of said communications traffic received from said first ring;

means for transporting at least a first of said duplicates received from said first ring from said primary central office to said remote central office;

means for transporting at least a second of said duplicates received from said first ring to said backup central office;

means in said backup central office for receiving from said primary central office said second duplicate received from said first ring;

means in said backup central office for selecting and supplying as an output for transmission to said remote central office either said second duplicate received from said first ring or said second copy of said second duplicate for potential transport;

means for transporting at least the output selected for transmission from said backup central office to said remote central office;

means in said remote central office for receiving from said primary central office said at least a first of said duplicates received from said first ring or the output selected for transmission from said backup central office; and means in said remote central office for selecting and supplying as output either the duplicate supplied as the output by said primary central office from said first ring or the output selected for transmission from said backup central office.

12. The system as defined in claim 11 wherein said selection and supplying as an output by said means for selecting in said backup central office is predetermined.

13. The system as defined in claim 12 wherein said second duplicate for potential transport is selected and supplied as an output.

14. The system as defined in claim 13 wherein said means for selecting in said backup central office includes:

means for separating from each other said second duplicate received from said first ring and any additional signals with which said second duplicate is multiplexed with;

means for terminating said second duplicate; and means for combining said second copy of said second duplicate for potential transport with said separated additional signals.

15. A communications network system for communicating between a customer location and a remote central office not directly serving said customer location in a network including;

i) a first communication ring interconnecting said customer location, a primary central office and a backup central office;

ii) a second communication ring interconnecting said primary central office, said backup central office and said remote central office; and iii) means for interconnecting said first ring and said second ring in said primary central office and in said backup central office wherein said second ring comprises:

means located at said remote central office for broadcasting at least two duplicates of communications traffic destined for said customer location;

means for transporting a first of said duplicates to said primary central office;

means for transporting a second of said duplicates to said backup central office;

means in said backup central office for broadcasting a first copy of said second duplicate to said primary central office and a second copy of said second duplicate for potential transport to said customer location;

means for transporting at least said first copy of said second duplicate from said backup central office to said primary central office; and means in said primary central office for selecting as an output for transmission to said first ring either said first duplicate or said first copy of said second duplicate.

16. The system as defined in claim 15 wherein said first ring includes;

means located at said primary central office for broadcasting at least two duplicates of said communications traffic received from said first ring;

means for transporting at least a first of said duplicates received from said first ring from said primary central office to said customer location;

means for transporting at least a second of said duplicates received from said first ring to said backup central office;

means in said backup central office for receiving from said primary central office said second duplicate received from said first ring;

means in said backup central office for selecting and supplying as an output for transmission to said customer location either said second duplicate received from said first ring or said second copy of said second duplicate for potential transport;

means for transporting at least the output selected for transmission from said backup central office to said customer location;

means in said customer location for receiving from said primary central office said at least a first of said duplicates received from said first ring or the output selected for transmission from said backup central office; and means in said customer location for selecting and supplying as an output either the duplicate supplied as the output by said primary central office from said first ring or the output selected for transmission from said backup central office.

* * * * *